(12) United States Patent
Cagan

(10) Patent No.: US 9,688,890 B2
(45) Date of Patent: Jun. 27, 2017

(54) WATER-BASED ADHESIVE FIXING COMPOSITION HAVING IMPROVED CREEP PROPERTIES

(71) Applicant: BOSTIK SA, La Plaine Saint Denis (FR)

(72) Inventor: Virginie Cagan, Montcourt-Fromonville (FR)

(73) Assignee: BOSTIK SA, La Plaine Saint Denis (FR)

( * ) Notice: Subject to any disclaimer, the term of this patent is extended or adjusted under 35 U.S.C. 154(b) by 0 days.

(21) Appl. No.: 14/973,035

(22) Filed: Dec. 17, 2015

(65) Prior Publication Data

US 2016/0177144 A1  Jun. 23, 2016

(30) Foreign Application Priority Data

Dec. 17, 2014 (FR) .................... 14 62641

(51) Int. Cl.
  *C08K 3/34* (2006.01)
  *C09J 133/02* (2006.01)
  *C09J 11/04* (2006.01)
  *C09J 125/14* (2006.01)

(52) U.S. Cl.
  CPC .......... *C09J 133/02* (2013.01); *C09J 11/04* (2013.01); *C09J 125/14* (2013.01); *C08L 2201/50* (2013.01); *C08L 2201/54* (2013.01)

(58) Field of Classification Search
  CPC ................. C09J 133/02; C09J 11/04
  USPC .......................................... 524/456
  See application file for complete search history.

(56) References Cited

U.S. PATENT DOCUMENTS

| 5,416,140 A * | 5/1995 | Columbus ............ C09D 131/04 206/813 |
| 8,197,944 B2 | 6/2012 | Beck et al. |
| 2003/0144405 A1* | 7/2003 | Lewin .................... C09J 125/14 524/493 |
| 2009/0324965 A1 | 12/2009 | Beck et al. |

FOREIGN PATENT DOCUMENTS

DE  10 2007 011511 A1  9/2008

OTHER PUBLICATIONS

Torro-Palau et al., J. Adhesion, 61, 195-211, 1997.*
Search Report for French Application No. 14/62.641 dated Jun. 16, 2015.
Torro-Palau, A. et al., "Comparison of the properties of polyurethane adhesives containing fumed silica or sepiolite as filler," Journal of Adhesion, Jan. 1997, vol. 61, No. 1, pp. 195-211.

* cited by examiner

*Primary Examiner* — Hui Chin
(74) *Attorney, Agent, or Firm* — Millen, White, Zelano & Branigan, P.C.

(57) ABSTRACT

The present invention relates to a composition comprising at least one aqueous dispersion of a copolymer of the styrene-(meth)acrylic/(meth)acrylate type, at least one filler, and a particular thickening system, as well as the use of such a composition as a fixing glue.

10 Claims, 2 Drawing Sheets

WATER-BASED ADHESIVE FIXING COMPOSITION HAVING IMPROVED CREEP PROPERTIES

The present invention relates to an adhesive composition comprising at least one aqueous dispersion of a copolymer of the styrene-(meth)acrylic/(meth)acrylate type, at least one filler, and a particular thickening system, as well as the use of said composition as a fixing glue.

Glues (also called adhesives or mastics) for fixing are commonly used by private individuals in DIY for fixing objects on various substrates such as floors, walls or ceilings, to avoid having recourse to the traditional mechanical fixing systems based for example on nails, screws and/or plugs.

As examples of objects that may be fixed, we may mention skirting boards, paneling, battens, spot-lights, hooks, mirrors, coat hooks or clothes pegs of various forms, supports for curtain rails and even supports for shelves intended for storage of dishes, kitchen utensils or books.

For these applications as fixing glues, it is very important to have an adhesive composition that ensures, as soon as the object and the substrate to be assembled are brought into contact after applying the glue, that they are held immediately with a very short setting time, avoiding the need to hold them by hand or to fit a clamp or props.

Moreover, when we wish to fix an object of appreciable weight or subjected to considerable loading on a substrate such as a vertical wall or a horizontal ceiling, the adhesive composition thus employed must in addition ensure a satisfactory cohesion of the adhesive joint, in order to guarantee solidity of the assembly obtained.

In particular, it is crucial for the adhesive joint to have good creep properties over time, to prevent the object becoming detached under the effect of the stresses exerted (shearing or pulling).

Among the various fixing glues already on the market, water-based glues represent an interesting solution in economic, environmental and toxicological respects. In particular, water-based fixing glues are less harmful to humans and the environment compared to solvent-based fixing glues, which comprise a large amount of organic solvent instead of water. In general, water-based glues can be used without special protection, without the operator being inconvenienced by emissions of organic solvent.

Relative to the other types of reactive or hot-melt fixing glues, water-based fixing glues are also easier to use. In fact, they do not require special conditions or precautions to be taken for their application or storage. In particular, the water-based fixing glues are ready to use. They can be applied without having to be heated beforehand.

Despite the aforementioned advantages, the tack of water-based glues remains limited notably when heavy objects or those intended to carry heavy loads are to be fixed on a substrate. A great many water-based fixing glues are not in fact suitable for fixing these heavy objects on approximately vertical substrates.

There have been previous attempts to improve this property using high contents of acrylate thickener in the adhesive composition, but this led to compositions that are difficult to apply, unstable in storage and with poor wetting properties in relation to the materials to be assembled.

To solve these problems, it was proposed in patent application US 2003/0144405 to use an adhesive composition obtained essentially from an aqueous dispersion of a copolymer of the styrene-acrylate type, a thickening system based on highly dispersed silica and an inverted emulsion of an aqueous solution of acrylic acid copolymer and acrylamide, mixed in particular proportions.

However, the adhesive composition obtained still requires improvement, notably in terms of tack.

Thus, there is a need for an adhesive composition allowing improved adhesive performance to be obtained, notably in terms of tack, relative to the existing water-based fixing solutions.

In addition there is a need for an adhesive composition having good creep properties, thus allowing an object to be fixed permanently on an approximately vertical substrate.

In particular, there is a need for an adhesive composition that is able to remedy the aforementioned drawbacks entirely or partly, while still having advantages comparable to the known water-based fixing solutions, notably in terms of environmental and health impacts, that is simple to use and has no storage constraints.

Surprisingly, it was discovered that the use of an adhesive composition according to the invention, as described hereunder, made it possible to meet the aforementioned needs wholly or partly, and notably obtain better tack relative to the water-based compositions disclosed in patent application US2003/014405.

In particular, it was observed that the adhesive composition according to the invention is in addition easy to extrude from 5 to 35° C., notably at room temperature (15-25° C.), using a conventional manual extrusion device used in the field of mastics (hand-held gun or skeleton gun with cartridge). Such a device generally has an extrusion nozzle having an outlet diameter in the range from 3 to 6 mm, as illustrated in the examples.

Moreover, it was observed that the adhesive composition according to the invention has satisfactory creep properties under load, giving durable fixing. In particular, it was observed that an object fixed with an adhesive composition according to the invention and stored in conditions of temperature and humidity as described in the examples does not become detached under the effect of its weight after a week and even several years after bringing the glued object into contact with the substrate.

The present invention therefore relates firstly to an adhesive composition comprising:

a) from 50 to 75 wt %, relative to the weight of the adhesive composition, of a dispersion in water of at least one polymer obtained from:
 (a1) a styrene monomer, and
 (a2) at least one comonomer selected from (meth)acrylic acids, basic salts of these acids, alkyl (meth)acrylates whose alkyl moiety, saturated or unsaturated, linear or branched, cyclic or acyclic, comprises from 1 to 30 carbon atoms, preferably from 1 to 12 carbon atoms, and more preferably from 1 to 8 carbon atoms, and said alkyl moiety may be interrupted by one or more oxygen atoms, may be epoxidized and/or may be terminated with a hydroxyl function, and optionally
 (a3) a silanized comonomer selected from vinyl silanes and silanized (meth)acrylic acid esters,
the content of dry matter in aqueous dispersion a) being in the range from 30 to 80 wt % relative to the weight of said aqueous dispersion a), b) from 2.5 to 6 wt %, relative to the weight of the adhesive composition, of at least one sepiolite, c) from 0.5 to 3 wt %, relative to the weight of the adhesive composition, of a composition selected from:
 c1) a water-based composition comprising at least one polymer obtained from:

(c1.1) at least one monomer selected from (meth)acrylic acids, 2-acrylamido-2-methyl propane sulphonic acid, 2-sulphoethyl methacrylate, styrene phosphonic acid, and the basic salts of these acids, and (c1.2) at least one comonomer selected from (meth) acrylamides and vinyl pyrrolidone, the content of dry matter in the water-based composition c1) being in the range from 10 to 40 wt % relative to the weight of said water-based composition c1), and c2) a water-based composition comprising:

(c2.1) at least one polymer obtained from:

(c2.1.1) at least one monomer selected from the (meth) acrylic acid esters and the maleic acid esters, said esters comprising at least one hydrocarbon group, saturated or unsaturated, linear or branched, cyclic or acyclic, comprising from 8 to 30 carbon atoms, preferably from 8 to 22 carbon atoms, and which moreover may or may not be alkoxylated by one or more $C_1$-$C_4$ oxyalkylene groups, and (c2.1.2) at least one comonomer selected from (meth) acrylic acids, and the (meth)acrylic acid esters not comprising a hydrocarbon group, saturated or unsaturated, linear or branched, cyclic or acyclic, comprising from 8 to 30 carbon atoms, or (c2.2) at least one polyurethane comprising at least one hydrocarbon group, saturated or unsaturated, linear or branched, cyclic or acyclic, comprising from 8 to 30 carbon atoms, and which moreover may or may not be alkoxylated by one or more $C_1$-$C_4$ oxyalkylene groups, the content of dry matter in the water-based composition c2) being in the range from 20 to 40 wt % relative to the weight of said water-based composition c2), and d) from 20 to 40 wt % of at least one filler.

Other aims, features and advantages of the present invention will become clearer on reading the description and examples.

In the present application, unless stated otherwise:

Polymer of the "styrene-(meth)acrylic/(meth)acrylate type" means a polymer obtained from the (co)monomers (a1), (a2) and (a3) as defined above.

"Alkyl (meth)acrylates" means an alkyl acrylate and/or an alkyl methacrylate.

"(Meth)acrylic acids" denotes an acrylic acid and/or a methacrylic acid. In particular, "(meth)acrylic acid esters" denotes an ester of acrylic acid and/or an ester of methacrylic acid.

"(Meth)acrylamides" denotes an acrylamide and/or a methacrylamide.

The basic salts of the acid (co)monomers of the polymers used in the adhesive composition according to the invention (as mentioned in points a2) and c1.1)) may be organic or inorganic salts. In particular, they may be amine salts or alkali metal salts, such as ammonium, sodium or potassium salts.

"Selected from" means that the products listed after this expression may be used alone or mixed with other products on said list.

Aqueous Dispersion a):

The polymer comprised in the aqueous dispersion a) is preferably present in anionic form in said aqueous dispersion a).

The pH of the aqueous dispersion a) is preferably in the range from 7 to 9, and more preferably from 7.5 to 8.5.

In particular, the polymer comprised in the aqueous dispersion a) has a glass transition temperature (Tg) less than or equal to 65° C.

The polymer comprised in the aqueous dispersion a) used in the adhesive composition according to the invention preferably has a content of styrene monomer of at least 30 wt %, more preferably of at least 50 wt %, relative to the weight of said polymer.

The polymer comprised in the aqueous dispersion a) is preferably obtained from two or three of the (co)monomers described above in points (a1), (a2) and (a3).

Among the polymers usable in the aqueous dispersion a), we may also mention those described in paragraph (0042) of patent application US 2003/0144405.

Preferably, the aqueous dispersion a) comprises a dry matter content that is in the range from 40 to 65 wt %, and better still from 45 to 55 wt %, relative to the weight of said aqueous dispersion a).

The aqueous dispersion a) is prepared in a way that is well known by a person skilled in the art. In particular, it may be prepared from a polymer as described above, in the form of powder, dispersed in a composition comprising water.

The polymer comprised in the aqueous dispersion a) may be synthesized as described in patent application US 2003/014405, for example by bulk polymerization or solution polymerization. It may also be obtained directly in the form of a dispersion by polymerization in a dispersed medium.

The aqueous dispersion a) may also be commercially available.

Among the aqueous dispersions a) available on the market, we may notably mention the products sold under the name:

Acronal® S813 by the company BASF, which corresponds to an aqueous dispersion of copolymer of styrene and acrylic acid ester, having a Tg of about 28° C., and whose dry matter content ranges from 49 to 51 wt % of the weight of the aqueous dispersion, Acronal® S533 by the company BASF, which corresponds to an aqueous dispersion of copolymer of styrene and acrylic acid, having a Tg of about 5° C., and whose dry matter content ranges from 51 to 53 wt % of the weight of the aqueous dispersion, Axilat® DS 2120 by the company Momentive, which corresponds to an aqueous dispersion of copolymer of styrene and acrylic acid ester, having a Tg of about 22° C. and a content by weight of styrene monomer of at least 30 wt % relative to the weight of said copolymer, and whose dry matter content is equal to about 50 wt % of the weight of the aqueous dispersion, and Ucar Latex DL 345 by the company Union Carbide, which corresponds to an aqueous dispersion of copolymer of styrene and acrylic ester, having a Tg of about 25° C. and a content by weight of styrene monomer of at least 30 wt % relative to the weight of said copolymer, and whose dry matter content is about 50 wt % of the weight of the aqueous dispersion.

The adhesive composition according to the invention preferably comprises from 60 to 70 wt %, relative to the weight of the adhesive composition, of an aqueous dispersion a) as described above.

Sepiolite b):

Sepiolite is a hydrated magnesium silicate in the class of phyllosilicates with fibrous structure. It can be represented ideally by the following general formula:

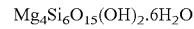

$Mg_4Si_6O_{15}(OH)_2.6H_2O$

Sepiolite is in the form of particles of acicular form (fibre, needle, rod).

The sepiolite b) usable according to the invention is a hydrophilic sepiolite, such as a sepiolite not modified with organic groups.

The maximum size of the particles of sepiolite b) is preferably under 10 μm.

In particular, at least 95 wt % of the particles of sepiolite b) are preferably under 5 μm.

The maximum size and the granulometry of the particles of sepiolite b) may be determined in a way that is well known by a person skilled in the art, by wet sieving.

The particles of sepiolite b) may have a diameter less than or equal to 30 nm, and preferably in the range from 15 to 25 nm.

The BET specific surface area of the particles of sepiolite b) is preferably greater than or equal to 150 m$^2$/g. More preferably, the BET specific surface area of the particles of sepiolite b) is in the range from 150 m$^2$/g to 320 m$^2$/g.

The BET specific surface area is determined by adsorption of nitrogen, according to standard ISO 9277:2010.

The sepiolite b) usable according to the invention is commercially available. For example the product sold under the name Pangel® S9 by the company Tolsa may be used.

The adhesive composition according to the invention preferably comprises from 2.9 to 6 wt %, relative to the weight of the adhesive composition, of at least one sepiolite as described above.

Water-Based Composition c1):

Preferably, the polymer comprised in the water-based composition c1) is obtained from:

(c1.1) at least one monomer selected from the (meth) acrylic acids and basic salts thereof, and (c1.2) at least one comonomer selected from the (meth) acrylamides.

More preferably, the polymer comprised in the water-based composition c1) is obtained from:

(c1.1) at least one monomer selected from acrylic acid and basic salts thereof, and (c1.2) an acrylamide comonomer.

Preferably, the water-based composition c1) has a pH in the range from 7 to 10, and more preferably in the range from 7.5 to 9.

The polymer comprised in the water-based composition c1) usable according to the invention is preferably obtained from two or three of the (co)monomers described above in points (c1.1) and (c1.2).

According to a preferred variant of the invention, the carboxyl groups from the monomers (c1.1) as listed above, are carried by the polymer of the water-based composition c1) in the form of the basic salts thereof.

The water-based composition c1) usable according to the invention is preferably a "water-in-oil" (W/O) emulsion, also called "inverted emulsion", i.e. an emulsion of an aqueous phase in an organic phase.

In particular, the polymer(s) present in the water-based composition c1) as described above is (or are) comprised in the aqueous phase of the inverted emulsion.

The organic phase of the inverted emulsion comprises hydrocarbons, linear or branched, cyclic or acyclic, aliphatic or aromatic, of $C_{10}$-$C_{20}$, preferably of $C_{11}$-$C_{16}$, obtained from petroleum distillation cuts.

The water-based composition c1) preferably comprises a dry matter content that is in the range from 25 to 35 wt % relative to the weight of said water-based composition.

The water-based composition c1) is prepared in a way that is well known by a person skilled in the art and may be available commercially.

Among the water-based compositions c1) usable and commercially available, preferably the products of the Texipol® series marketed by the company Scott Bader are used. These products correspond to anionic inverted emulsions in which the aqueous phase comprises at least one copolymer obtained from acrylic acid, notably in the form of sodium salt, and of acrylamide, and the organic phase is a $C_{11}$-$C_{16}$ hydrocarbon oil of the isoalkane type with less than 2 wt % of aromatic hydrocarbon relative to the weight of the inverted emulsion.

Water-Based Composition c2):

Preferably, the polymer (c2.1) comprised in the water-based composition c2) is obtained from:

(c2.1.1) at least one monomer selected from the alkyl (meth)acrylates and alkyl mono- or dimaleates, the alkyl moiety, linear or branched, cyclic or acyclic of each of these monomers comprising from 8 to 30 carbon atoms, preferably from 10 to 22 carbon atoms, and which moreover may or may not be alkoxylated by one or more $C_1$-$C_4$ oxyalkylene groups, and (c2.1.2) at least one comonomer selected from the (meth) acrylic acids and the alkyl (meth)acrylates whose linear or branched, cyclic or acyclic moiety comprises from 1 to 4 carbon atoms.

More preferably, the polymer (c2.1) comprised in the water-based composition c2) is a polymer obtained from:

(c2.1.1)—0.5 to 40 wt %, preferably from 1 to 25 wt %, of at least one monomer selected from the maleic acid esters of formula (I) and the (meth)acrylic acid esters of formula (II):

$$R^2OOC-CH=CH-COO(CH_2CH_2O)-_nR^1 \quad (I)$$

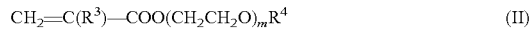

$$CH_2=C(R^3)-COO(CH_2CH_2O)_mR^4 \quad (II)$$

In formulae (I) and (II):

$R^1$ and $R^4$ represent each an alkyl, aryl or alkaryl group, comprising from 8 to 30 carbon atoms, and preferably from 10 to 22 carbon atoms, $R^2$ represents a hydrogen atom or a monovalent group $-(CH_2CH_2O)_nR^5$ in which $R^5$ represents an alkyl, aryl or alkaryl group, comprising from 8 to 30 carbon atoms, and preferably from 10 to 22 carbon atoms, $R^3$ represents a hydrogen atom or a methyl group, n and m are numbers in the range from 2 to 150, (c2.1.2)—from 20 to 50 wt % of at least one comonomer selected from the (meth)acrylic acids, and from 30 to 80 wt % of at least one comonomer selected from the alkyl (meth)acrylates whose linear or branched, cyclic or acyclic alkyl moiety is of $C_1$-$C_4$.

The polymer (c2.1) comprised in the water-based composition c2) usable according to the invention is preferably obtained from two or three of the (co)monomers described above in points (c2.1.1) and (c2.1.2).

In particular, the polymers (c2.1) and (c2.2) may be multiblock polymers such as block copolymers or block terpolymers.

They may also be grafted or star.

Preferably, the $C_1$-$C_4$ oxyalkylene group(s) that may be present in polymers (c2.1) and (c2.2) may be selected from oxyethylene, oxypropylene, and mixture thereof.

Advantageously, polymers (c2.1) and (c2.2) are associative polymers. In particular, polymer (c2.1) is an anionic associative polymer and polymer (c2.2) is a non-ionic associative polymer.

"Associative polymer" means an amphiphilic polymer comprising hydrophilic groups and hydrophobic groups which, in an aqueous medium, will tend to assemble together or with hydrophobic moieties of other molecules, such as surfactants, and lead to thickening of the medium.

The hydrophilic groups and the hydrophobic groups may be located in the main chain of the associative polymer or at the end of the chain. They may in particular be distributed in blocks in the main chain of the polymer.

The hydrophilic groups and the hydrophobic groups may also be pendent (or grafted) on the main chain of the associative polymer, or on pendent (or grafted) groups on the main chain of said polymer.

The hydrophilic groups of the associative polymers (c2.1) and (c2.2) are preferably selected from carboxyl groups in acid form (COOH), ether (oxyalkylene) groups that may be derived from monomers (c2.1.1) and carboxylate groups derived from monomers (c2.1.1), as described above.

The hydrophobic groups of the associative polymers (c2.1) and (c2.2) are preferably selected from $C_8$-$C_{30}$, and preferably $C_{10}$-$C_{22}$, hydrocarbon groups, as described above.

Preferably, the polymer comprised in the water-based composition c2) is dispersed in water.

The water-based composition c2) preferably comprises a dry matter content that is in the range from 25 to 35 wt % relative to the weight of said water-based composition c2).

The water-based composition c2) is prepared in a way that is well known by a person skilled in the art and may be available commercially.

Among the water-based compositions c2) usable and commercially available, preferably the products are used that are marketed under the following names:

Acrysol® TT-615 by the company Rohm & Haas, which corresponds to an aqueous dispersion of anionic associative polymer according to the invention, based on acrylate comprising hydrophobic groups, whose dry matter content is equal to about 30 wt % of the weight of said aqueous dispersion, Rheovis® PU 1190 and 1191 by the company BASF, each of which corresponds to an aqueous dispersion of non-ionic associative polyurethane according to the invention, whose dry matter content ranges from 30 to 34 wt % relative to the weight of said aqueous dispersion.

The adhesive composition according to the invention may comprise from 0.5 to 2 wt %, and preferably from 0.6 to 1.5 wt % of a water-based composition c1) or c2) as described above, relative to the weight of the adhesive composition.

Preferably, the adhesive composition according to the invention comprises a mixture of water-based compositions c1) and c2) as described above.

Preferably, the pH of the adhesive composition according to the invention is greater than or equal to 7.

The adhesive composition according to the invention comprises at least one mineral or organic filler.

Preferably, a mineral filler is used, and more preferably calcium carbonate.

The calcium carbonate may be hydrophilic or hydrophobic, in which case the calcium carbonate may be surface-treated with an organic compound so as to give it a hydrophobic character.

The calcium carbonate may be precipitated or micronized. Preferably, micronized calcium carbonate is used.

The filler content that may be used in the adhesive composition according to the invention is preferably in the range from 30 to 35 wt % relative to the weight of the adhesive composition.

The adhesive composition according to the invention preferably comprises at least one plasticizer.

The plasticizer is preferably selected from the hydroxylated compounds that are liquid at room temperature (15-25° C.) and have from 4.0 to 5.0 milliequivalents of OH function per gram of plasticizer (meq/g).

As an example of hydroxylated compounds that may be used, we may mention, non-exhaustively, alcohol esters, alcohol ethers, alcohols and mixtures thereof.

In particular, we may use:

alcohol esters such as 2,2,4-trimethyl-1,3-pentanediol monoisobutyrate, di(propylene glycol) monoisobutyrate, lactate of iso-$C_8$-$C_{10}$ alcohol, hexanol hydroxysuccinate and tartrates of iso-$C_9$-$C_{11}$ alcohol, alcohol ethers such as tri(propylene glycol) monomethyl ether, alcohols such as iso-$C_{11}$-$C_{14}$ alcohol.

Preferably, the product marketed under the name Texanol® by the company Eastman Chemical is used, comprising at least 98.5 wt % of 2,2,4-trimethyl-1,3-pentanediol monoisobutyrate (4.62 meq/g) relative to the weight of said commercial product.

Preferably, the total plasticizer content usable in the adhesive composition according to the invention ranges from 0.5 to 1.5 wt % relative to the weight of the adhesive composition.

The adhesive composition according to the invention may comprise at least one additive selected from pigments, pot preservatives, antifoaming agents, antifungals, antibacterials, with a total content of additive(s) that may range from 0.2 to 1 wt % relative to the weight of the adhesive composition.

The adhesive composition according to the invention may further comprise at least one dispersant for improving the wettability of the adhesive composition, such as a filler and/or pigment dispersant. As an example of a dispersant that is usable, we may mention a water-based composition of sodium or ammonium polyacrylate (having a dry extract of about 30-50 wt %), in a content preferably in the range from 0.1 to 0.8 wt % relative to the weight of the adhesive composition. The sodium polyacrylates may also be used in the form of powder.

These dispersants are commercially available. As an example of a dispersant usable according to the invention, we may mention the commercial product Ecodis® P90 sold by the company Coatex, which corresponds to a water-based composition of ammonium polyacrylate at 40 wt % dry extract relative to the weight of said water-based composition.

The adhesive composition according to the invention is prepared by simple mixing of its ingredients, as described in patent application US 2003/014405.

The nature of the substrate or of the objects to be assembled may be selected from any type of material usually employed in the area of construction, such as wood, glazed earthenware, glass, cement, fibrocement, plaster, Placoplatre® (plasterboard), brick, metal, plastic such as PVC.

The adhesive composition according to the invention is easy to use at room temperature (15-25° C.). In particular, the adhesive composition according to the invention is easy to extrude using a mastic cartridge or hand-held gun commonly used by private individuals, as illustrated in the examples.

The adhesive composition according to the invention may be extruded in the form of stud(s) or a strand.

The present invention also relates to the use of the adhesive composition as defined above as a fixing glue.

In particular, the adhesive composition according to the invention may be used for fixing an element (or object) on a substrate such as a ceiling, a floor or an approximately vertical substrate.

The adhesive composition is suitable in particular for fixing an element of more than 1.5 kg on an approximately vertical substrate, such as a wall.

"Approximately vertical substrate" means a substrate whose plane of the surface intended to receive the element to be fixed is roughly perpendicular to the floor. When the element is laid flat against such a substrate and then released, this element is not held, but drops to the floor, in the absence of fixation.

"Approximately vertical substrate" is intended also to cover the cases in which the plane of the surface of the substrate is such that when an element is put on the substrate and then released, this element, under the effect of its weight, and in the absence of fixation, quickly slides off the substrate.

The element and the substrate on which said element is intended to be fixed may consist of different materials. These materials may be porous or non-porous. They may be of mineral, organic or composite origin. We may mention for example, as porous materials that are usable, plaster tiles, brick, laminated materials based on cardboard and plaster such as are marketed under the name Placoplatre® by the company Saint Gobain, concrete, cement, fibrocement, and wood, and as non-porous materials, glazed earthenware, metal, PVC and other plastics. The nature of the materials of the object and of the substrate is selected in principle so that at least one of the two surfaces to be assembled consists of a porous material. This choice allows the water contained in the fixing glue to be absorbed on the surface of the porous material and ensures fixing of any element affixed to said surface.

The adhesive composition according to the invention may be applied on just one of the two surfaces to be joined. This is called single gluing (as opposed to double gluing, when the composition is applied on both surfaces to be joined).

After applying the glue, the element coated with glue is immediately brought into contact with the substrate.

The use of the adhesive composition according to the invention is therefore simple, quick and economical.

Figure 1:
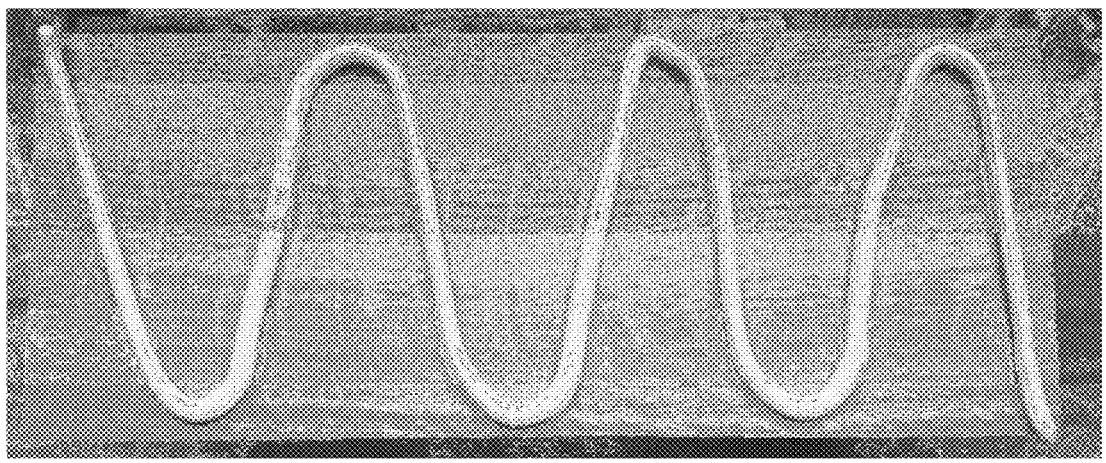
FIG. 1 shows application of the adhesive of the invention to a substrate

The following examples are given purely for illustration of the invention and are not to be interpreted as limiting its scope.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding FR application No. 14/62.641, filed Dec. 17, 2014 are incorporated by reference herein.

EXAMPLES

Each of the adhesive compositions in examples 1 to 3 is prepared by mixing the ingredients described in Table 1 below by the method of preparation described in application US2003/0144405. In particular, the composition in example 3 corresponds to the composition in the examples in patent application US2003/0144405. The filler used in this example is a highly dispersed hydrophilic silica sold by the company Wacker under the name Silica HDK® T30, and the dispersant used in this example is a water-based composition of ammonium polyacrylate at 35 wt % dry extract, sold by the company BASF under the name Pigmentverteiler®.

The contents of the ingredients presented in Table 1 are expressed in grams.

TABLE 1

| Ingredients | Ex. 1 (invention) | Ex. 2 (invention) | Ex. 3 (comparative) |
| --- | --- | --- | --- |
| Axilat ®DS2120 | 61.4 | 61.6 | 64.75 |
| Pangel ® S9 | 4.9 | 4.9 | — |
| Silica HDK ® T30 | — | — | 2.0 |
| Texipol ® 63-202 | — | 1.1 | 2.0 |
| Acrysol ® TT615 | 1.4 | — | — |
| CaCO$_3$ | 30.5 | 30.6 | 29.9 |
| Texanol ® | 1.0 | 1.0 | — |
| Ecodis ® P90 | 0.4 | 0.4 | — |
| Pigmentverteiler ® | — | — | 1.0 |
| Water, additives | q.s. 100 | q.s. 100 | q.s. 100 | q.s.: quantity sufficient to reach a total weight of the composition of 100 g

Two test series are carried out on each of the adhesive compositions prepared.

Test Series No. 1:

For each of the adhesive compositions prepared, the following are evaluated at the moment of use: the ease of use of the composition and the strength of the glued joint on wood, alternately varying the weight of the object glued on, until rupture of the glued joint occurs.

The operating protocol followed for each of the adhesive compositions tested is described below.

Operating Protocol:

On the front of an oak board of about 155 g, with length of 25 cm and width of 10 cm, several weights are fixed so as to obtain an object (board+weight) of about 1.5 kg, representing gluing of approximately 60 kg/m$^2$. The weights fixed are distributed uniformly on the surface of the board in order to obtain an object of uniform weight overall.

After preparation of the adhesive composition, it is put in a mastic cartridge equipped with an extrusion nozzle having an outlet diameter of 5 mm and extruded manually using a skeleton gun on the back of the oak board.

For each test, the adhesive composition is applied on the board in a zigzag pattern as illustrated in FIG. 1.

The length of the strand of adhesive composition extruded is about 0.7 meters.

Immediately after application of the adhesive composition, the coated face of the board is pressed firmly against a sheet of Placoplatre® about 2.5 meters long and 1.20 meters wide, fixed beforehand on a vertical wall.

The position of the board is recorded accurately on the Placoplatre® sheet, for subsequently determining the creep properties of the adhesive composition.

The assembly is left to dry for 24 hours at 20° C. and 60% relative humidity.

Measurement of the Creep Properties Under Load (at 24 Hours):

After drying for 24 h in the conditions stated above, the cohesion of the adhesive joint is evaluated.

If the wooden board remained glued on its Placoplatre® substrate without creep of more than 1 mm toward the floor, it is considered that the adhesive joint is strong enough to support the surface load applied of 60 kg/m². Then the test is started again, increasing the surface load applied by 20 kg/m² until the adhesive joint is no longer strong enough to support said load, i.e. until we observe:

either detachment of the board, which drops to the floor, or creep of the adhesive joint. This creep is reflected in vertical movement of the board toward the floor of more than 1 mm relative to its initial position.

Figure 2:
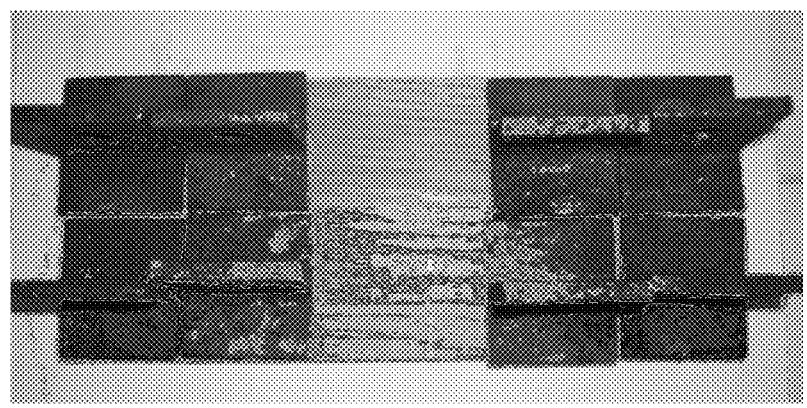
FIG. 2-4 shows the use of increasing weights on the substrate to test adhesion.
Figure 3:
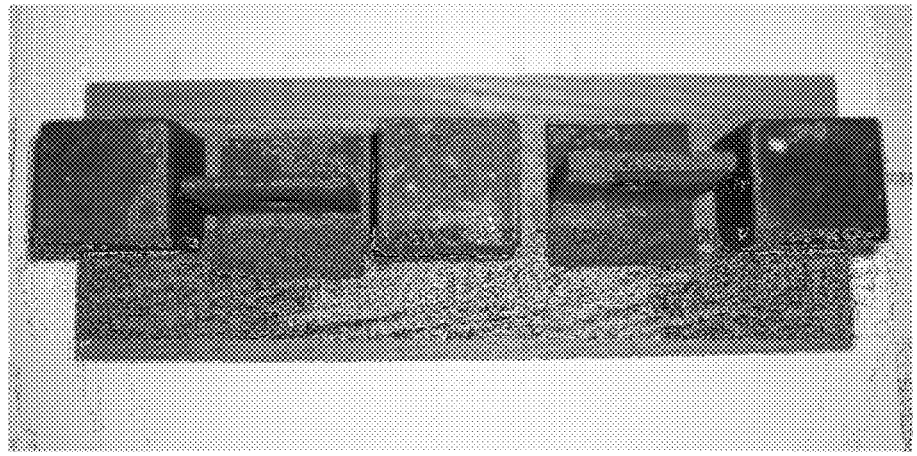
Figure 4:
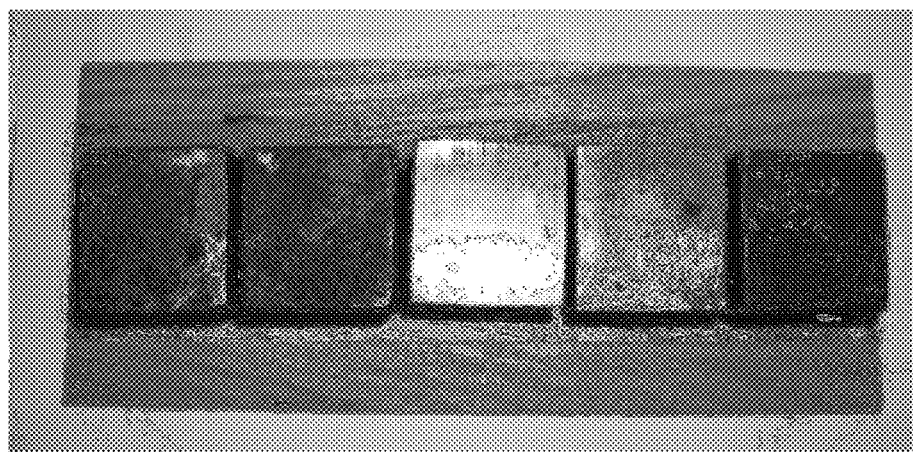

FIGS. 2, 3 and 4 show the distribution of the weights fixed to the surface of the board corresponding to a surface load of 60 kg/m², 80 kg/m² and 100 kg/m² respectively.

The surface load applied before which detachment of the board is observed, corresponds to the maximum surface load allowing the object to be held in place. The value of the latter is expressed in kilograms per square meter and is given in Table 2.

The results show that the compositions of examples 1 and 2 according to the invention are able to fix a heavier object on a wall than the composition of example 3 according to the prior art. The adhesive compositions according to the invention therefore have better tack than the composition of the prior art.

Evaluation of the Ease of Use of the Adhesive Composition:

The extrudability of the adhesive composition is evaluated at the moment of application of the composition by the operator in the conditions described above.

It was found that the compositions of examples 1 and 2 according to the invention offer the same advantages in terms of ease of use, notably by extrusion, relative to the composition of example 3 according to the prior art.

Test Series No. 2: Tensile Shear Strength

Unless stated otherwise in the present application, preparation of the test specimens and the tests of tensile shear strength were carried out according to standard NF EN 1465, using a Zwick Z020 dynamometer.

The test specimens used for the tests are prepared by cutting strips 10 cm long, 2.5 cm wide and 5 mm thick from natural beech.

A test specimen of beech, with its free end coated beforehand with an adhesive composition on an overlap 2.5 cm long and 2.5 cm wide, is put in each of the jaws of the dynamometer. The test specimens are assembled by aligning and bringing into contact the zones coated with adhesive, pressing them against one another.

Coating with the adhesive composition was carried out using a standardized notched-edge spatula so as to obtain, after pressing, a continuous adhesive joint with thickness of about 0.2 mm on the overlapped zone.

The assembly is left to dry for 7 days at 23° C. and 50% relative humidity.

Tensile Shear Strength (at 7 Days):

After drying for 7 days in the conditions mentioned above, the strength of the adhesive joint is evaluated by applying a vertical pulling force at a constant speed of 500 meters per second.

The shearing force applied on the adhesive joint is measured continuously until rupture of the assembly. The maximum value recorded before rupture corresponds to the shear strength of the adhesive composition at 7 days. The results are expressed in newtons per square meter and are given in Table 2 below.

The values of shear strength observed for the compositions of examples 1 and 2 according to the invention are above 20.10⁵ N/m² (minimum value acceptable), and even above 50.10⁵ N/m², thus showing that the adhesive joint formed gives good hold (called final tack) even 7 days after bringing the surfaces coated with adhesive into contact. This value at 7 days demonstrates the maximum value of gluing attained, while knowing that this value is maintained over time for several years.

TABLE 2

| Characteristics | Ex. 1 (invention) | Ex. 2 (invention) | Ex. 3 (comparative) |
|---|---|---|---|
| Maximum load tolerated at 24 h (in kg/m²) (oak/Placoplatre ®) | 100 | 100 | 60 |
| Tensile shear strength at 7 days (in N/m²) (beech/beech) | $58 \cdot 10^5$ | $67 \cdot 10^5$ | — |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An adhesive composition comprising:
   a) from 50 to 75 wt %, relative to the weight of the adhesive composition, of an aqueous dispersion in water of at least one polymer obtained from:
      (a1) a styrene monomer, and
      (a2) at least one comonomer that is a (meth)acrylic acid, a basic salt of said acid, an alkyl (meth)acrylate whose alkyl moiety, saturated or unsaturated, linear or branched, cyclic or acyclic, has 1 to 30 carbon atoms, said alkyl moiety optionally being interrupted by one or more oxygen atoms, optionally epoxidized and/or optionally terminated with a hydroxyl function, and optionally
      (a3) a silanized comonomer that is a vinyl silane or a silanized (meth)acrylic acid ester,
      the aqueous dispersion a) having a content of dry matter of 30 to 80 wt % relative to the weight of said dispersion a),
   b) from 2.5 to 6 wt %, relative to the weight of the adhesive composition, of at least one sepiolite,
   c) from 0.5 to 3 wt %, relative to the weight of the adhesive composition, of a composition comprising:
      c1) a water-based composition comprising at least one polymer obtained from:
         (c1.1) at least one monomer that is a (meth)acrylic acid, 2-acrylamido-2-methyl propane sulphonic acid, 2-sulphoethyl methacrylate, styrene phosphonic acid, or a basic salt of these acids, and
         (c1.2) at least one comonomer that is a (meth)acrylamide or vinyl pyrrolidone,
         the content of dry matter in the water-based composition c1) being 10 to 40 wt % relative to the weight of said water-based composition c1), and/or
      c2) a water-based composition comprising:
         (c2.1) at least one polymer obtained from:
            (c2.1.1) at least one monomer that is a (meth)acrylic acid ester or maleic acid ester, said ester comprising at least one hydrocarbon group, saturated or unsaturated, linear or branched, cyclic or acyclic, having from 8 to 30 carbon atoms, and which moreover may or may not be alkoxylated by one or more $C_1$-$C_4$ oxyalkylene groups, and (c2.1.2) at least one comonomer that is a (meth)acrylic acid or a (meth)acrylic acid ester not having a hydrocarbon group, saturated or unsaturated, linear or branched, cyclic or acyclic, having from 8 to 30 carbon atoms, or (c2.2) at least one polyurethane comprising at least one hydrocarbon group, saturated or unsaturated, linear or branched, cyclic or acyclic, having from 8 to 30 carbon atoms, and which moreover may or may not be alkoxylated by one or more $C_1$-$C_4$ oxyalkylene groups, the water-based composition c2) having content of dry matter 20 to 40 wt % relative to the weight of said water-based composition c2), and d) from 20 to 40 wt % of at least one filler.

2. The composition according to claim 1, wherein the polymer in the aqueous dispersion a) has a glass transition temperature (Tg) less than or equal to 65° C.

3. The composition according to claim 1, wherein the polymer in the water-based composition c1) is obtained from:
(c1.1) at least one monomer that is a (meth)acrylic acid or basic salt thereof, and
(c1.2) at least one comonomer that is a (meth)acrylamide.

4. The composition according to claim 1, wherein the water-based composition c1) is an inverted emulsion.

5. The composition according to claim 1, wherein the polymer (c2.1) comprised in the water-based composition c2) is obtained from:
(c2.1.1) at least one monomer that is an alkyl (meth)acrylate or alkyl mono- or dimaleate, the alkyl moiety, linear or branched, cyclic or acyclic of each of these monomers having from 8 to 30 carbon atoms, and which moreover may or may not be alkoxylated by one or more $C_1$-$C_4$ oxyalkylene groups, and
(c2.1.2) at least one comonomer from that is a (meth)acrylic acid or alkyl (meth)acrylate whose linear or branched, cyclic or acyclic alkyl moiety has 1 to 4 carbon atoms.

6. The composition according to claim 1, wherein the polymers (c2.1) and (c2.2) are associative polymers.

7. The composition according to claim 1, having a pH greater than or equal to 7.

8. The composition according to claim 1, wherein the filler is calcium carbonate, and said filler may be hydrophilic or hydrophobic, precipitated or micronized.

9. The composition according to claim 1, comprising at least one plasticizer that is a hydroxylated compound that is liquid at a temperature of 15 to 25° C., and possess from 4.0 to 5.0 milliequivalents of OH function per gram of plasticizer.

10. In a fixing glue, capable of fixing an element on a ceiling, a floor or an approximately vertical substrate, said fixing glue comprising an adhesive, wherein the improvement comprising using the adhesive of claim 1.

* * * * *